United States Patent
Yamamoto

(10) Patent No.: US 8,265,379 B2
(45) Date of Patent: Sep. 11, 2012

(54) IMAGE PROCESSING METHOD, IMAGE PROCESSING APPARATUS, IMAGE DATA COMPRESSION APPARATUS, AND COMPUTER PROGRAM READABLE STORAGE MEDIUM

(75) Inventor: Toshitsugu Yamamoto, Takatsuki (JP)

(73) Assignee: Konica Minolta Business Technologies, Inc. (JP)

( * ) Notice: Subject to any disclaimer, the term of this patent is extended or adjusted under 35 U.S.C. 154(b) by 866 days.

(21) Appl. No.: 12/145,787

(22) Filed: Jun. 25, 2008

(65) Prior Publication Data

US 2009/0003693 A1 Jan. 1, 2009

(30) Foreign Application Priority Data

Jun. 27, 2007 (JP) ................. 2007-169662

(51) Int. Cl.
*G06K 9/00* (2006.01)
*G06K 9/34* (2006.01)
*G06K 9/36* (2006.01)

(52) U.S. Cl. .................. 382/164; 382/168; 382/171

(58) Field of Classification Search .................. None
See application file for complete search history.

(56) References Cited

U.S. PATENT DOCUMENTS

| | | | | |
|---|---|---|---|---|
| 6,058,211 A * | 5/2000 | Bormans et al. | ............. | 382/235 |
| 6,320,981 B1 | 11/2001 | Yada | ............. | 382/168 |
| 6,426,809 B1 * | 7/2002 | Hayashi et al. | ............. | 358/529 |
| 6,917,704 B2 | 7/2005 | Kojima et al. | ............. | 382/166 |
| 6,961,462 B2 * | 11/2005 | Watanabe et al. | ............. | 382/164 |
| 2006/0067575 A1 * | 3/2006 | Yamada | ............. | 382/176 |
| 2008/0123945 A1 * | 5/2008 | Andrew et al. | ............. | 382/164 |

FOREIGN PATENT DOCUMENTS

| | | |
|---|---|---|
| JP | 11-075069 | 3/1999 |
| JP | 2001-338284 | 12/2001 |

OTHER PUBLICATIONS

Nettleton, Nick. CMYK, RGB and PPH, Jul. 4, 2006. [retrieved May 25, 2011]. Retrieved from the internet: <http://developer.loftdigital.com/blog/cmyk-rgb-and-php>.*
Japanese Official Communication dated May 17, 2011 for corresponding Japanese patent application No. 2007-169662 and its English translation.

* cited by examiner

*Primary Examiner* — Jason M Repko
*Assistant Examiner* — David F Dunphy
(74) *Attorney, Agent, or Firm* — Cantor Colburn LLP

(57) ABSTRACT

In image processing that expresses a small region with a predetermined number of representative colors, the image processing being carried out for each of small regions, with respect to the content of one small region, based on the extent of variation in that small region of each of the values of a plurality of color variables that express the color of each pixel, a target color variable is selected (#104), among values from the maximum value to the minimum value of the target color variable in that small region, a value of the target color variable for which the number of pixels is "0" is obtained as a reference value, and the pixels in that small region are grouped based on the reference value (#106), and a representative color of each group is obtained (#109).

17 Claims, 18 Drawing Sheets

0 : (51, 51, 153)
1 : (253, 167, 162)

00 : (51, 51, 153)
01 : (254, 229, 221)
10 : (253, 167, 162)
11 : (252, 105, 112)

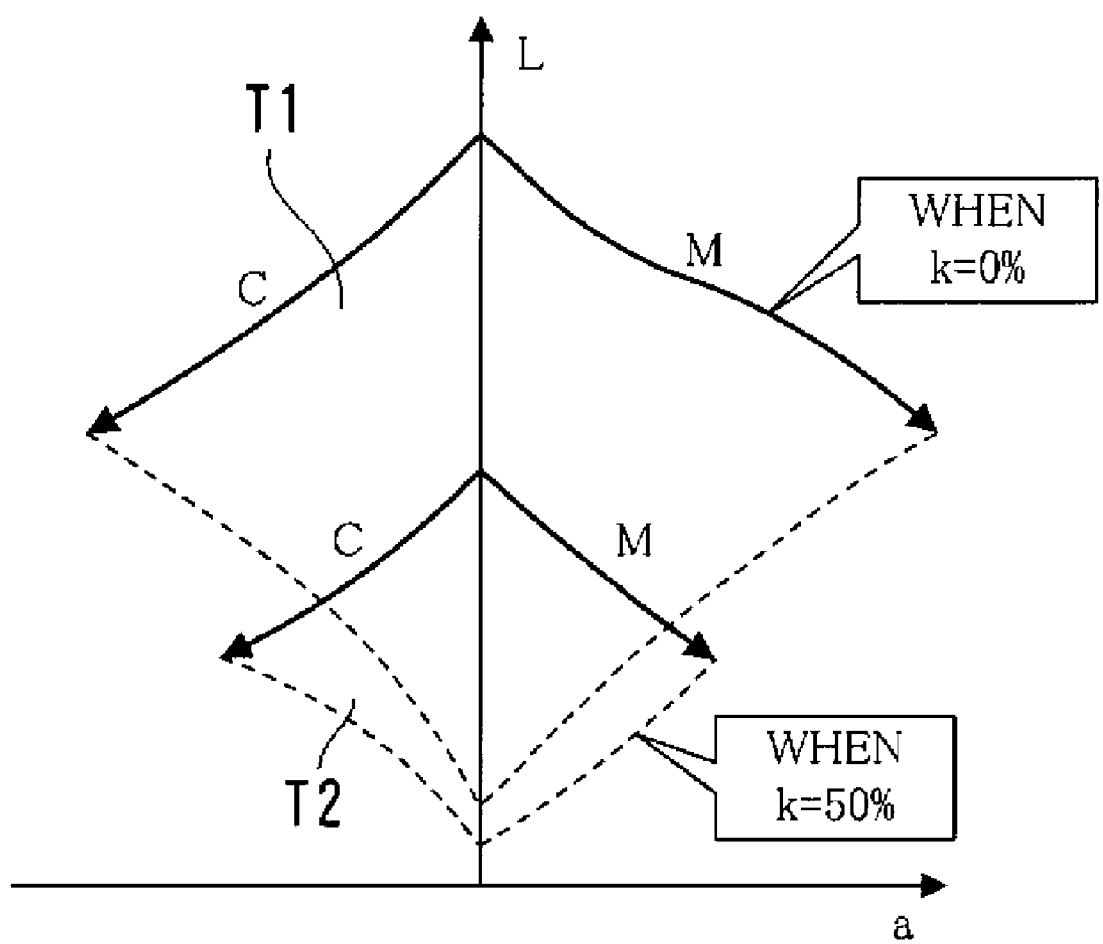

FIG. 15A

|  | R | G | B |
|---|---|---|---|
| REGION B1 | 154 | 154 | 154 |
| REGION B2 | 34 | 34 | 34 |
| REGION B3 | 3 | 34 | 34 |

FIG. 15B

|  | L | R_G | B |
|---|---|---|---|
| REGION B1 | 154 | 142 | 154 |
| REGION B2 | 34 | 142 | 34 |
| REGION B3 | 18 | 127 | 34 |

IMAGE PROCESSING METHOD, IMAGE PROCESSING APPARATUS, IMAGE DATA COMPRESSION APPARATUS, AND COMPUTER PROGRAM READABLE STORAGE MEDIUM

This application is based on Japanese patent application No. 2007-169662 filed on Jun. 27, 2007, the contents of which are hereby incorporated by reference.

BACKGROUND OF THE INVENTION

1. Field of the Invention

The present invention relates to an image processing method and apparatus that compresses image data.

2. Description of the Related Art

Conventionally, various techniques are used as methods for compressing image data, and one of those is a method referred to as "BTC (Block Truncation Coding)".

In this method, image data (referred to below as simply an "image") is partitioned into a plurality of blocks, and by reducing the number of colors in the blocks by expressing pixels in each block as an approximate color (a representative color), the amount of data is reduced.

Specifically, for example, this method involves the following. First, an average value of the darkness value of the pixels in the partitioned blocks is obtained, and those pixels are divided into a group of pixels with a darkness value higher than the average value and a group of pixels with a darkness value lower than the average value. Furthermore, an average value of the darkness value is obtained for each group. Then, a color expressed by that average value is set as an approximate color of that group. More specifically, the color of all pixels in that group is set to the same approximate color. Such processing is performed for all blocks included in the image data. As technology related to this BTC, methods such as that in U.S. Pat. No. 6,917,704 disclosed below have been proposed.

According to the method in U.S. Pat. No. 6,917,704, the dispersal of colors (color components) R (red), G (green), and B (blue) in a small region (block) included in image data is calculated, and the color (color component) for which that dispersal is largest is set as a target color. The average value of this target color in the small region is obtained. Then, the pixels in the small region are divided into groups based on that average value. More specifically, those pixels are divided into a group of pixels with a higher darkness value than the average value of that target color, and a group of pixels with a lower darkness value than the average value of that target color. Next, the average value of the darkness value of each color component of the pixels in each group is obtained, and the color expressed by that average value is set as a representative color of each group. Then, a determination is made of whether or not the number of representative colors obtained is equal to or greater than a desired number of colors, and if the number of colors is less than the desired number of colors, further division into groups is performed. If the number of colors is equal to or greater than the desired number of colors, processing is then performed for the next small region.

With BTC, in this manner, the image in a block is converted to an image with small number of colors. The amount of data is reduced by allowing some amount of reduction in image quality due to this conversion.

Here, a case is considered in which an image conversion is performed using BTC, for a block BK shown in FIG. 16A. Note that, in the original image of an image shown in FIG. 16A, a hatched portion is expressed in blue and a background portion around the hatched portion is expressed in gradations of red. Shown in the block BK is an image expressed by pixels in the block BK, the image including a line drawing portion JS that shows a line drawing and a background portion that is a background of the line drawing portion JS. As shown in FIG. 16A, the color of the background portion gradually grows darker toward the lower right of the block BK.

When considering conversion of the image in this sort of block BK to an image expressed with two approximate colors in BTC processing, it is desirable to be able to convert to an image like that shown in FIG. 16B, in which it is possible to distinguish between the line drawing portion JS and the background portion. Because an approximate color is substituted for the color of each pixel, a reduction in image quality in the block BK is unavoidable, but because the block BK itself is sufficiently small, even if the image quality of each block BK is reduced somewhat, a reduction in the image quality of the image as a whole is essentially not observed.

However, when this sort of method of U.S. Pat. No. 6,917,704 is applied to the block BK, there may be cases where it is not possible to convert to an image like that in FIG. 16B, in which the line drawing portion JS and the background portion are appropriately separated. For example, there may be cases where the darkness values of respective pixels in the block BK are related in the manner shown in FIG. 17. Note that in FIG. 17, a L*a*b* (Lab) color space is used, not an RGB color space.

FIG. 17 shows the distribution of pixels in the block BK for color components "L" and "b". In FIG. 17, line JL indicates the average value of the darkness value of "L" of pixels in the block BK.

In the example in FIG. 17, it is understood that with respect to the "L" color component, the pixels of the background portion are distributed crossing the average value.

In this case, when the "L" color component is selected as the target color, a portion of the pixels of the background portion is classified in the same group as the pixels of the line drawing portion JS, and that portion is converted to the same approximate color as the line drawing portion JS. Thus, the image after conversion becomes as shown in FIG. 18.

As is understood from FIG. 18, in a portion of the background portion that has been converted to the same approximate color as the line drawing portion JS, the color becomes dark and so that portion stands out from the other pixels of the background portion. When viewing the image as a whole, that portion may appear as noise in the form of a black point. When there are many such portions, the image quality of the image as a whole is greatly reduced.

SUMMARY

The present invention was made in view of such problems, and it is an object thereof, in image processing that reduces the number of colors of image data to reduce the amount of data, to suppress a reduction in image quality relative to the reduction in the conventional technology.

An image processing method according to one embodiment of the invention is an image processing method for expressing small regions in an image with not more than a predetermined number of representative colors, in which an image processing is carried out for each of the small regions. The method includes a first selection step of, with respect to a plurality of pixels in the small region, based on variation values that indicate the extent of variation, in the small region, of values of a plurality of color variables that express a color of each of the pixels, selecting one of the color variables as a target color variable, a first reference value calculation step of, from among values from a maximum value to a minimum value of the target color variable in the small region, when there is a value of the target color variable for which the number of pixels is "0", obtaining the value of the target color variable as a first reference value for grouping the pixels, a first grouping step of grouping the pixels in the small region based on the first reference value obtained in the first reference value calculation step, and a first representative color calculation step of, for each of groups in the first-grouped small region, obtaining a representative color based on a value of each of the color variables of pixels that belong to the group.

BRIEF DESCRIPTION OF THE DRAWINGS

FIG. 13 shows the relationship between the change in the values of C and M in a CMYK color space, and the change in the values of L and a in a Lab color space.

FIG. 15A and FIG. 15B show values of each color variable for the block shown in FIG. 14.

DESCRIPTION OF THE PREFERRED EMBODIMENTS

Figure 1:
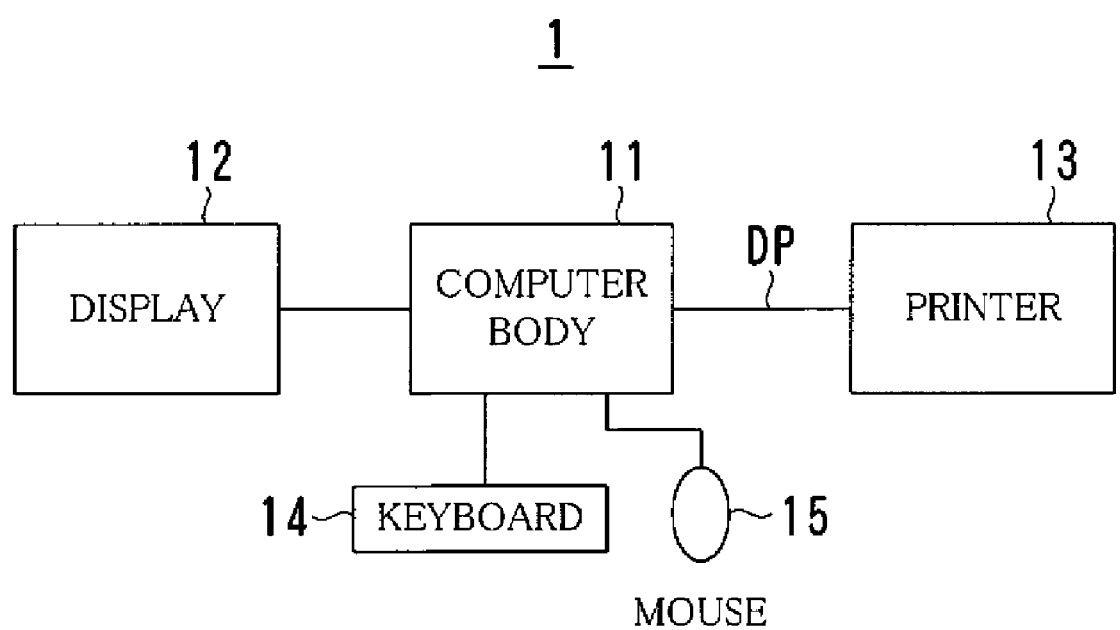
FIG. 1 shows the overall configuration of a printing system in which a method for compressing image data according to an embodiment of the invention has been applied.

In FIG. 1, a printing system 1 is a system for printing images with a printer 13, based on commands input to a computer body 11 by a user. The printing system 1 is configured from the computer body 11, a display 12, a keyboard 14, a mouse 15, the printer 13, and the like. The computer body 11 and the printer 13 are connected with a communications cable, such as a USB cable or an RS-232C cable. The computer body 11 and the printer 13 may also be connected via a communications network such as a LAN.

The computer body 11 saves data of images, documents, or the like that has been input from outside or internally generated, to a storage medium of the computer body 11 such as a hard disk. When a command to execute printing has been given by a user using the keyboard 14, the mouse 15, or the like, data of a print target for that command is converted to data in a predetermined format for printing such as a page description language, and sent to the printer 13. Below, data of a print target that is sent from the computer body 11 to the printer 13 may be referred to as "print target data DP".

The printer 13 compresses the print target data DP sent from the computer body 11 using a BTC (Block Truncation Coding) compression method according to this embodiment, and saves the compressed print target data DP to a storage medium such as an internal memory. Then, when one page of data is saved, printing of that page is started.

Note that a personal computer, a workstation, or the like is used as the computer body 11. A color-capable laser printer, MFP, or the like is used as the printer 13.

Figure 2:
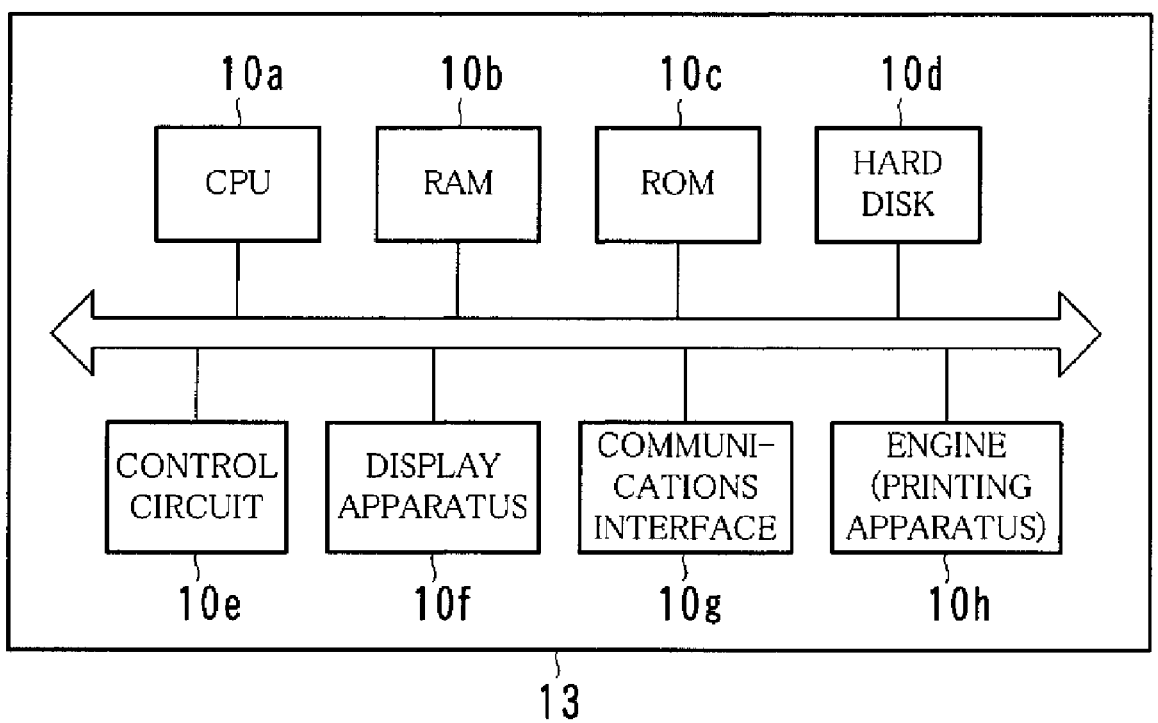
FIG. 2 shows an example hardware configuration of a printer.

As shown in FIG. 2, the printer 13 is configured from a CPU 10$a$, a RAM 10$b$, a ROM 10$c$, a hard disk 10$d$, a control circuit 11$e$, a display apparatus 10$f$, a communications interface 10$g$, a printing apparatus 10$h$, and the like.

The CPU 10$a$ performs overall control of the printer 13. Various programs and data are installed on the hard disk 10$d$ and are read to the RAM 10$b$ as necessary, and a program that has been read is executed by the CPU 10$a$. Some or all of the programs or the data may be stored in the ROM 10$c$.

The printing apparatus 10$h$ prints images to paper based on print target data that has been sent from the computer body 11 or the like.

The communications interface 10$g$ is an interface for performing communications with other apparatuses, with a format such as RS-232C or USB. The communications interface 10$g$ may also be a NIC (Network Interface Card), a modem, or the like.

The display apparatus 10$f$ displays messages to the user that operates the printer 13, content the user has set, or the like.

The control circuit 10$e$ is a circuit for controlling apparatuses such as the hard disk 10$d$, the printing apparatus 10$h$, the communications interface 10$g$, and the display apparatus 10$f$.

Figure 3:
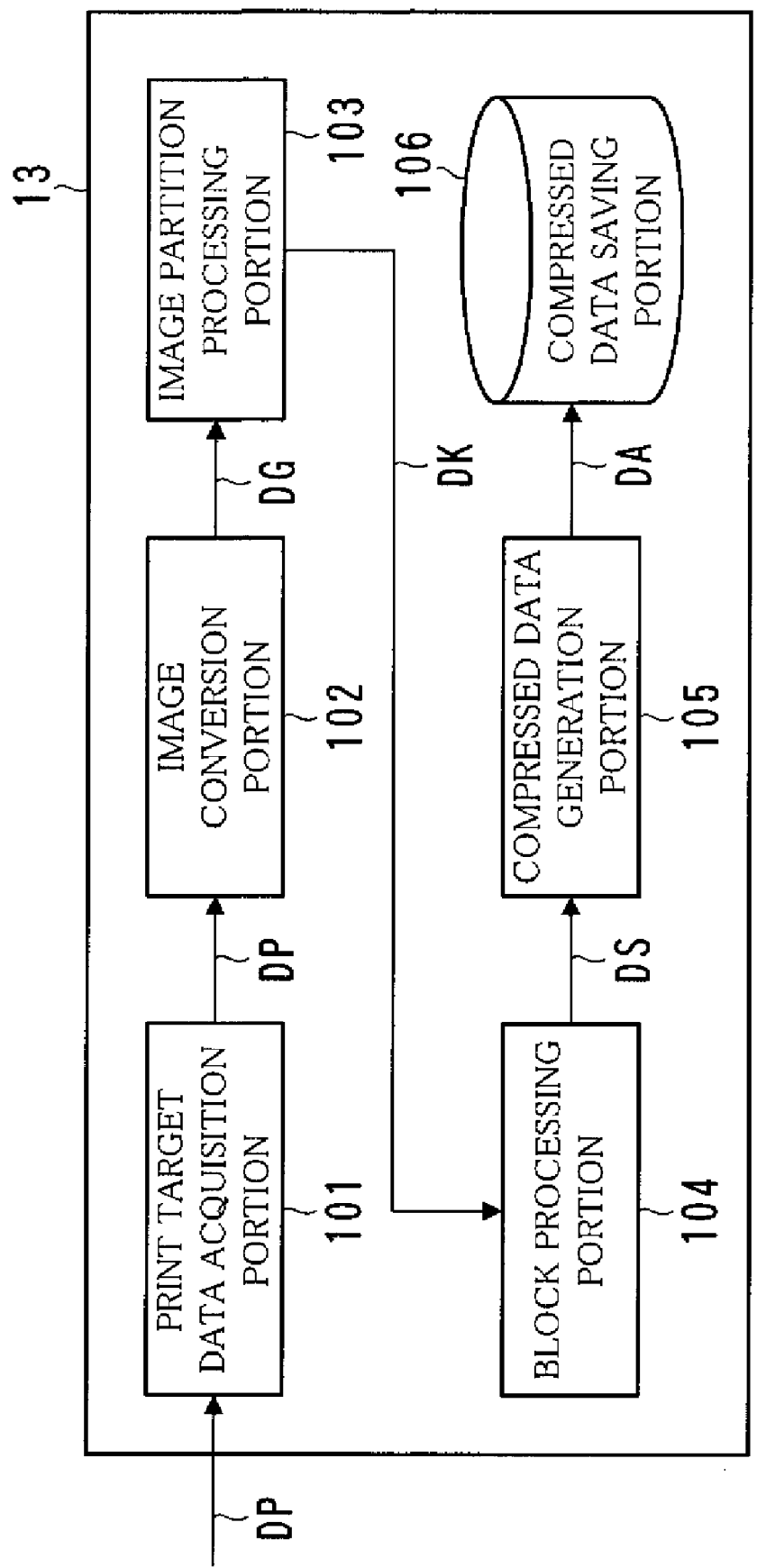
FIG. 3 shows an example functional configuration of a printer.
Figure 4:
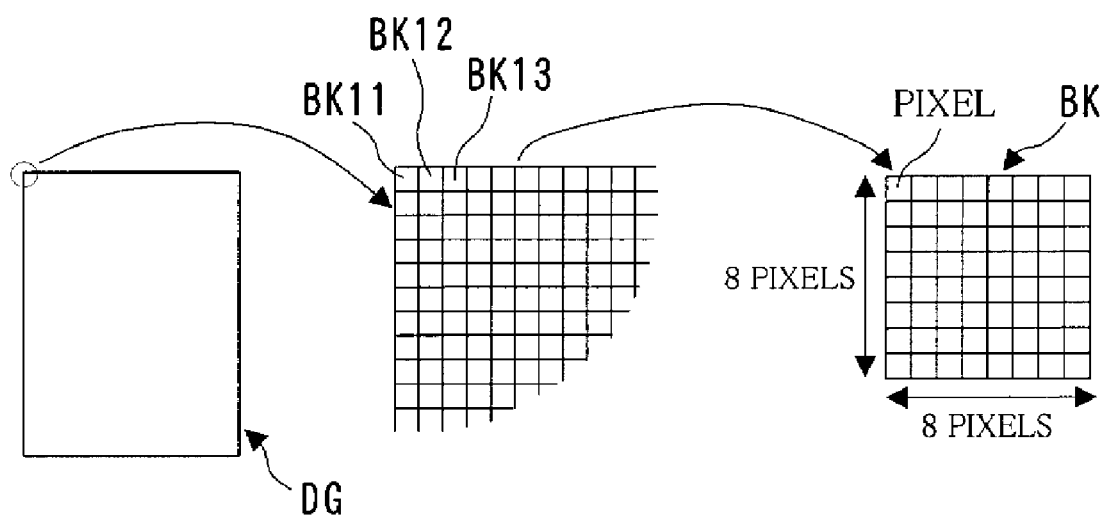
FIG. 4 is a diagram for illustrating blocks that have been partitioned.

FIG. 3 shows an example functional configuration of the printer 13, and FIG. 4 is a diagram for illustrating blocks that have been partitioned.

As shown in FIG. 3, the printer 13 is configured from a print target data acquisition portion 101, an image conversion portion 102, an image partition processing portion 103, a block processing portion 104, a compressed data generation portion 105, a compressed data saving portion 106, and the like.

The programs and data for realizing the function of each of these portions are installed on the hard disk 10$d$. These programs and data are read to the RAM 10$b$ as necessary, and such programs are executed by the CPU 10$a$. Some or all of these programs or data may be stored in the ROM 10$c$. Also, some or all of the functions shown in FIG. 3 may be realized with hardware such as the control circuit 10$e$.

The print target data acquisition portion 101 acquires print target data DP that is sent from the computer body 11 or the like. The image conversion portion 102 converts the acquired print target data DP to image data DG in the form of bitmap image data or the like. In this embodiment, conversion to image data expressed by primary colors R (red), G (green) and B (blue) (RGB), or image data expressed by primary colors C (cyan), M (magenta), Y (yellow), and K (black)

(CMYK), is performed. In this embodiment, image data is used in which the primary colors are S-bit, with 256 tones.

Below, image data may be referred to as simply an "image", with the word "data" omitted. Also, an image expressed with RGB primary colors may be referred to as an "RGB image", and an image expressed with CMYK primary colors may be referred to as a "CMYK image".

As shown in FIG. 4, the image partition processing portion 103 performs processing that partitions the image data DG into blocks BK, which are small regions of a predetermined size. Note that in this embodiment, the image data DG is partitioned into blocks BK that each have a size of 8 pixels in the vertical direction and 8 pixels in the horizontal direction. Below, the blocks BK may be distinguished by assigning consecutive numbers "block BK1", "block BK2", etc. Likewise with respect to other reference numerals, items may be distinguished by assigning consecutive reference numerals, and referred to collectively by omitting the reference numerals.

In this processing, the image partition processing portion 103 generates block data DK for each block BK. The block data DK includes coordinates of that block BK, the size of that block BK, darkness values for each pixel within that block, and the like. As the coordinates of the block BK, for example, the coordinates of the pixel at the upper left end of that block BK are used, where the upper left end of the image data DG serves as an origin point. The darkness values are darkness values of the respective color components, such as RGB, that express the color of the pixel.

Below, in this specification, "R", "G", and "B" may be written as color variables, which are variables that respectively indicate a darkness value for each color component R, G, and B. Letters that likewise correspond to other color components, such as C, M, Y, K, L (luminosity), R_G (red-green level), and B (blue level), may also be written as color variables.

The block processing portion 104, for each block BK, performs BTC processing according to this embodiment, and outputs processed block data DS.

In this embodiment, here, the darkness values of each pixel in the block BK are corrected according to a predetermined rule, and the pixels are divided into groups based on the values after correction. This grouping is repeated until a predetermined condition related to the number of groups or the like is satisfied.

Then, a representative color of each group is obtained, and by setting that representative color as an approximate color of pixels that belong to that group, the number of colors in the block is reduced, thus reducing the amount of data.

Specific processing procedures will be described below, separately for the case of an RGB image and the case of a CMYK image.

The compressed data generation portion 105 generates compressed data DA of the image data DG, using the processed block data DS of each block BK. The compressed data saving portion 106 saves compressed data DA that has been generated. When one page of compressed data DA is saved, printing of that page is started.

Below, in a first example and a second example, processing of the block processing portion 104 will be described in further detail.

First Example

Figure 5:
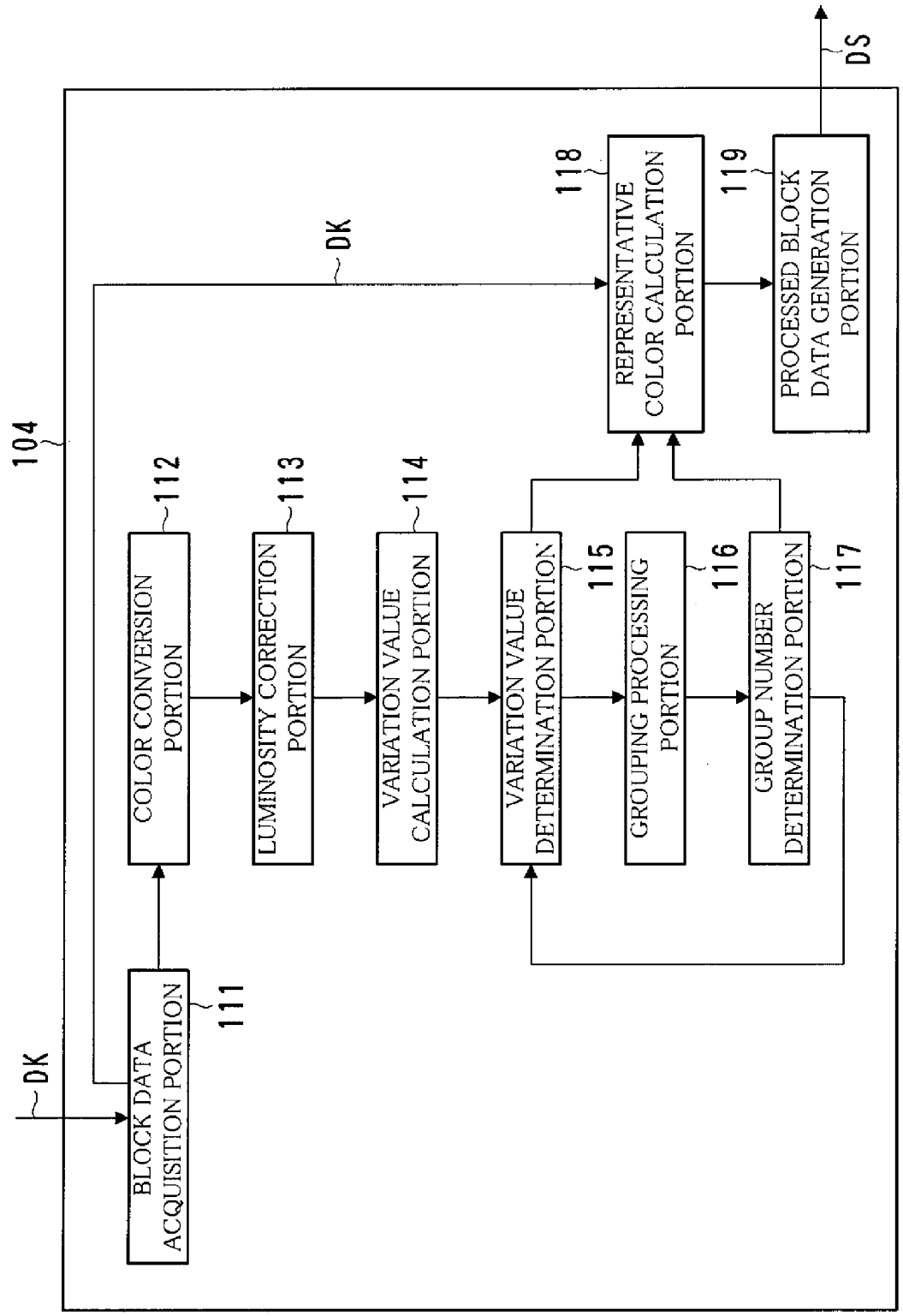
FIG. 5 shows an example configuration of a block processing portion.
Figure 6:
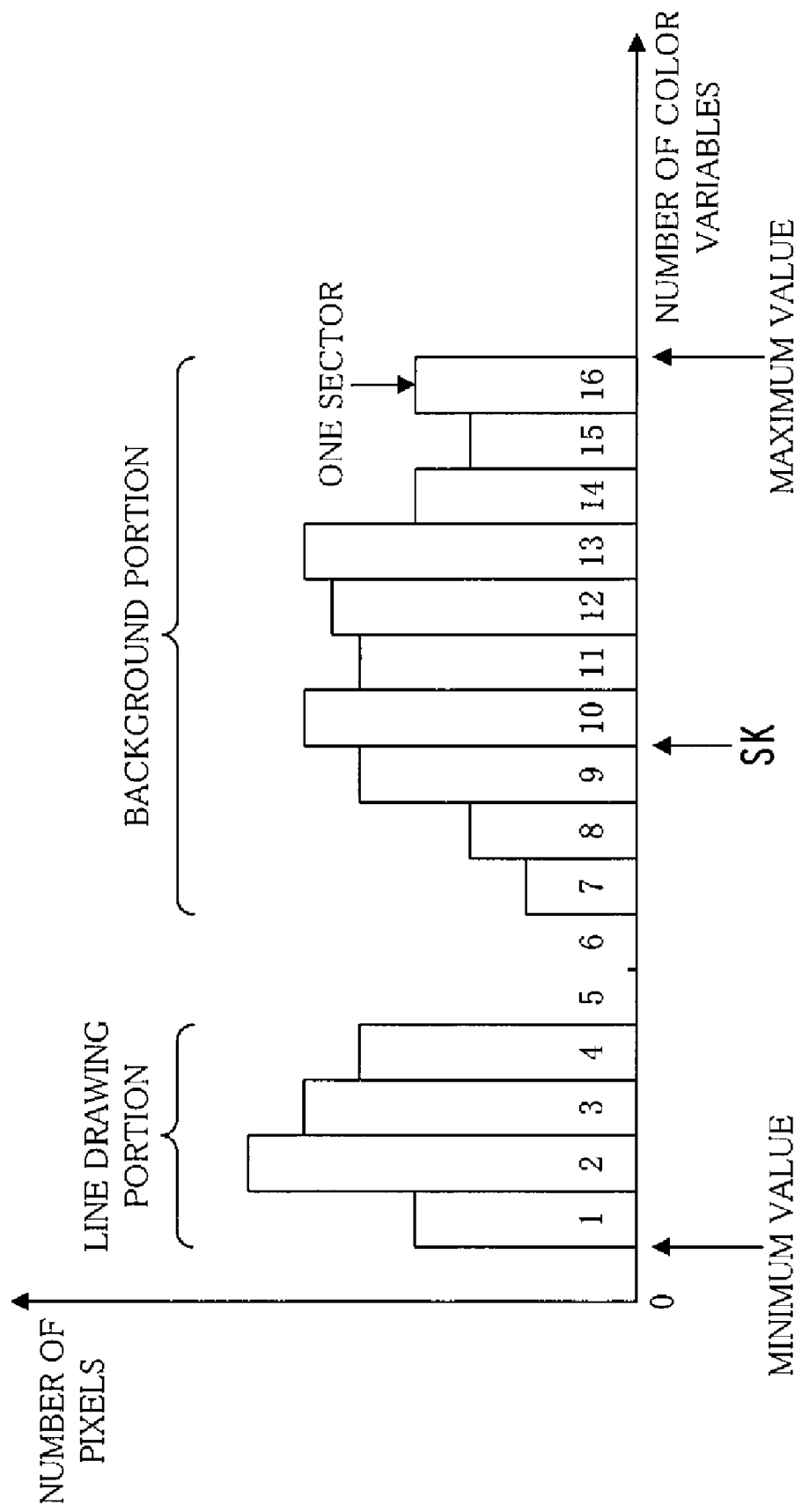
FIG. 6 shows a histogram with respect to the relationship between the value of a target variable and the number of pixels in a block.
Figure 7A:
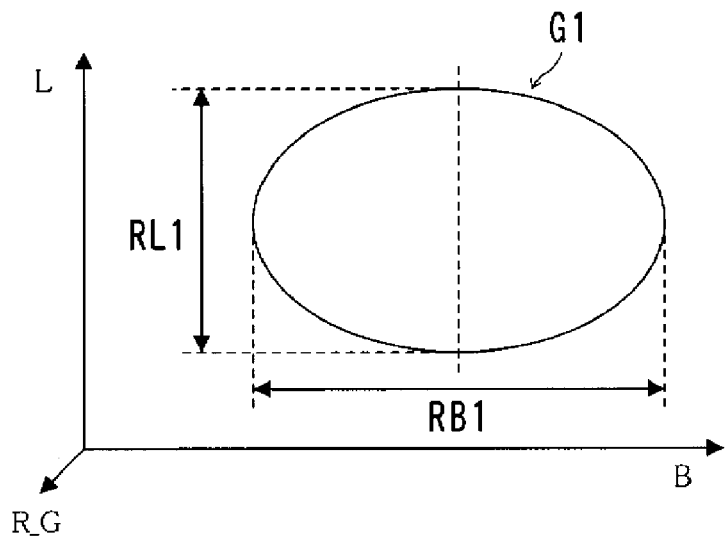
FIG. 7A, FIG. 7B, and FIG. 7C are diagrams for illustrating grouping of pixels when viewed in a color space of L, R_G, and B.

FIG. 5 shows an example configuration of the block processing portion 104, FIG. 6 shows a histogram with respect to the relationship between the value of a target variable and the number of pixels in the block BK, and FIG. 7 is a diagram for illustrating grouping of pixels when viewed in a color space of L, R_G, and B.

In this first example, processing of the block processing portion 104 will be described for a case where the print target data DP is converted to RGB image data DG in the image conversion portion 102.

As shown in FIG. 5, the block processing portion 104 is configured from a block data acquisition portion 111, a color conversion portion 112, a luminosity correction portion 113, a variation value calculation portion 114, a variation value determination portion 115, a grouping processing portion 116, a group number determination portion 117, a representative color calculation portion 118, a processed block data generation portion 119, and the like.

The block data acquisition portion 111 acquires block data DK from the image partition processing portion 103. Below, processing performed with respect to a block BK1 of the acquired block data DK will be described.

The color conversion portion 112, in order to appropriately weight the values of color variables when converting and correcting the color variables in processing hereafter, obtains values in a color space of L, R_G, and B, from the values (darkness values) of each color variable R, G, and B for each pixel in the block BK1 indicated in the block data DK. Specifically, with respect to each pixel, by substituting the value of each color variable R, C, and B into the right side, the value of each color variable L, R_G, and B (blue signal) on the left side is obtained.

$$L = (R \times 3 + G \times 6) \div 8$$

$$R\_G = (R \times 6 + (255-G) \times 3) + B$$

$$B = B \quad (1)$$

The luminosity correction portion 113 performs correction in order to emphasize the luminosity of pixels in the block BK. Specifically, "L2" on the left side of formula (2) below is obtained by substituting the value of luminosity L obtained by the color conversion portion 112 into the right side. Note that "L2" is a color variable that indicates the value of luminosity after correction.

$$L2 = L + ((L-(Lmax-HR)) \times (L-(Lmax-HR))) \div HR \quad (2)$$

Here,

L2: luminosity after correction
L: luminosity before correction
Lmax: constant (in this first example, (255×(3+6)÷8)) and
HR (Highlight Range): constant (in this first example, 30).

Also, in this first example, this correction is only performed when the condition $$L > Lmax - HR \quad (3)$$

is satisfied.

Thus, the luminosity of each pixel is corrected so as to be ever greater as the luminosity of each pixel increases. It is understood from experience that the change in the apparent color stands out more in bright portions (highlight portions) of an image than the change in dark portions. This correction is made in consideration of that property.

The values of the color variables L2, R_G, and B obtained in this manner are, for each pixel, saved in a predetermined storage region associated with the coordinates of that pixel in the block BK1, for example.

The variation value calculation portion 114 obtains variation values that indicate the variation state of each color variable in the block BK1 or the extent of variation. Specifically, variation values are obtained according to the following formula (4), using the pixels in the block BK1 as one group.

$$R1=(RG\text{max}-RG\text{min})\times(N+3)\times 2$$

$$R2=(L\text{max}-L\text{min})\times(N+3)\times 3$$

$$R3=(B\text{max}-B\text{min})\times(N+3)\times 1 \quad (4)$$

Here,
R1: variation value of R_G in group
R2: variation value of L2 in group
R3: variation value of B in group
RGmax: maximum value of R_G in group
RGmin: minimum value of R_G in group
Lmax: maximum value of L2 in group
Lmin: minimum value of L2 in group
Bmax: maximum value of B in group
Bmin: minimum value of B in group
N: number of pixels in group.

As indicated in formula (4), in this first example, as variation values, the amount of change in each color variable L2, R_G, and B in the block BK1, i.e. the difference between maximum and minimum values, is obtained. At this time, weighting is performed such that the variation values increase as the number of pixels in the block BK1 increases. Note that a dispersion value of the value of each color variable in the block BK may also be obtained as variation values.

The variation value determination portion 115 determines whether or not the maximum value among the variation values obtained for each color variable is equal to or less than a predetermined threshold value, i.e., whether or not the condition of formula (5) below is satisfied. If not greater than the predetermined threshold value, the processing of the representative color calculation portion 118 described later is performed.

Note that in this formula, a determination is made of whether or not a value in which N+3, which is the weighting related to the number of pixels in formula (4), is excluded from the variation value, is equal to or less than 6. Also, this corresponds to a value of equal to or less than 6, which is the change width of R_G.

$$R\text{max}<6\times(N+3) \quad (5)$$

Here,
Rmax: maximum value of obtained variation values
N: number of pixels in group.

The grouping processing portion 116 performs processing in order to divide the pixels in the block BK1 into two groups when the variation value is greater than the predetermined threshold value. This processing is performed in the following manner.

First, of the color variables L2, R_G, and B, the color variable with the largest variation value is selected as the target variable (target color). Then the minimum value and maximum value of that target variable in the block BK1 are obtained. The range from the minimum value to the maximum value is divided into 16 equal parts. Below, respective ranges that have been provided by dividing into 16 equal parts may be referred to as "sectors". Further, for each sector, the number of pixels in the block BK1 for which the value of the target variable is within the range of that sector is counted, and a histogram is generated that indicates the relationship between the sector and that number.

Figure 16A:
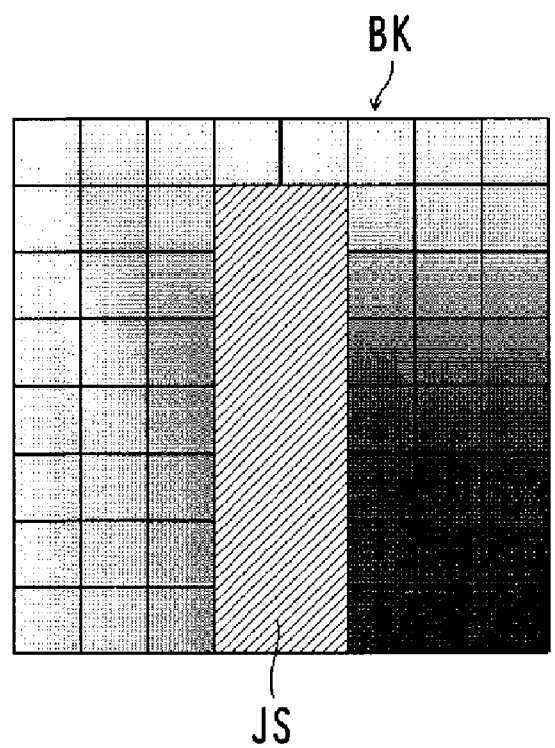
FIG. 16A and FIG. 16B show a block that includes an image with a line drawing portion and a background portion.
Figure 16B:
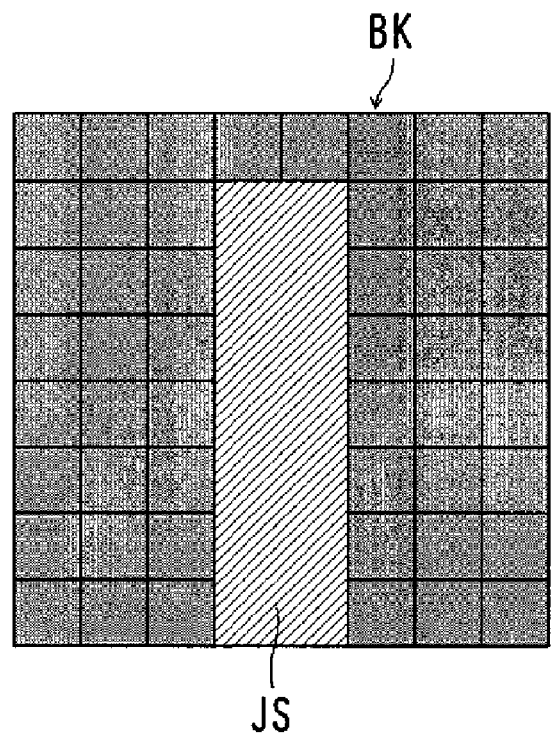
Figure 17:
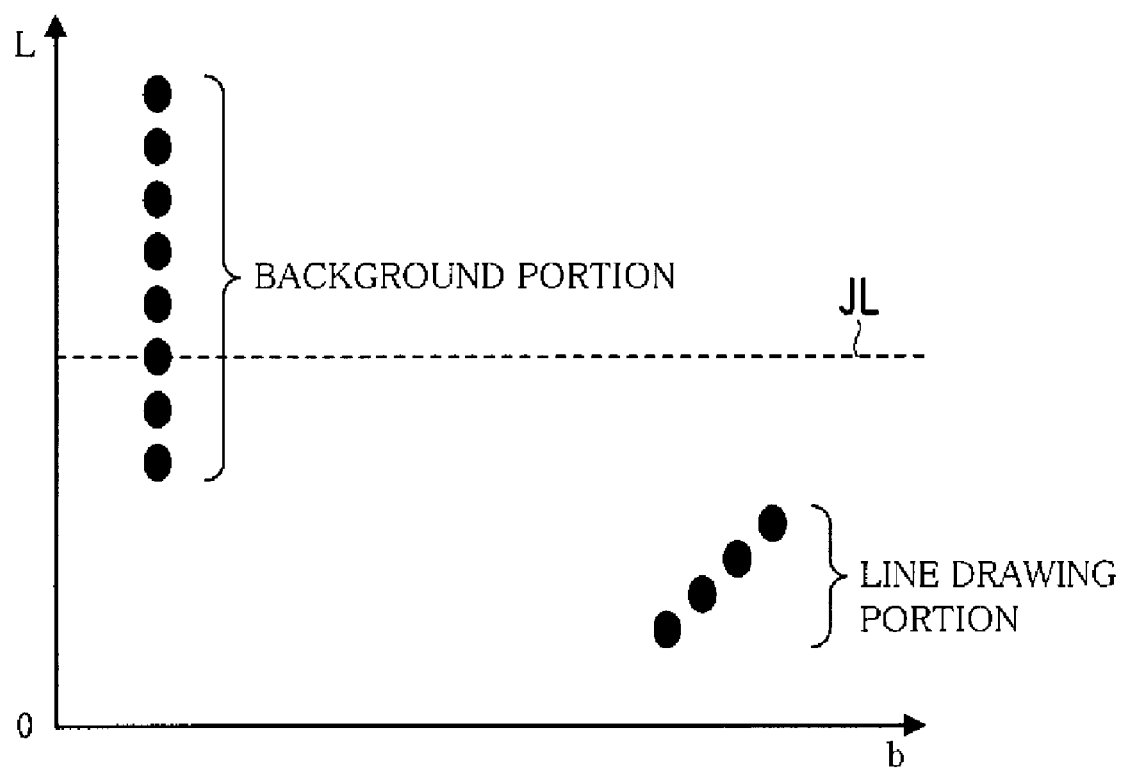
FIG. 17 shows the distribution of L and b in a Lab color space for each pixel in the block shown in FIG. 16.
Figure 18:
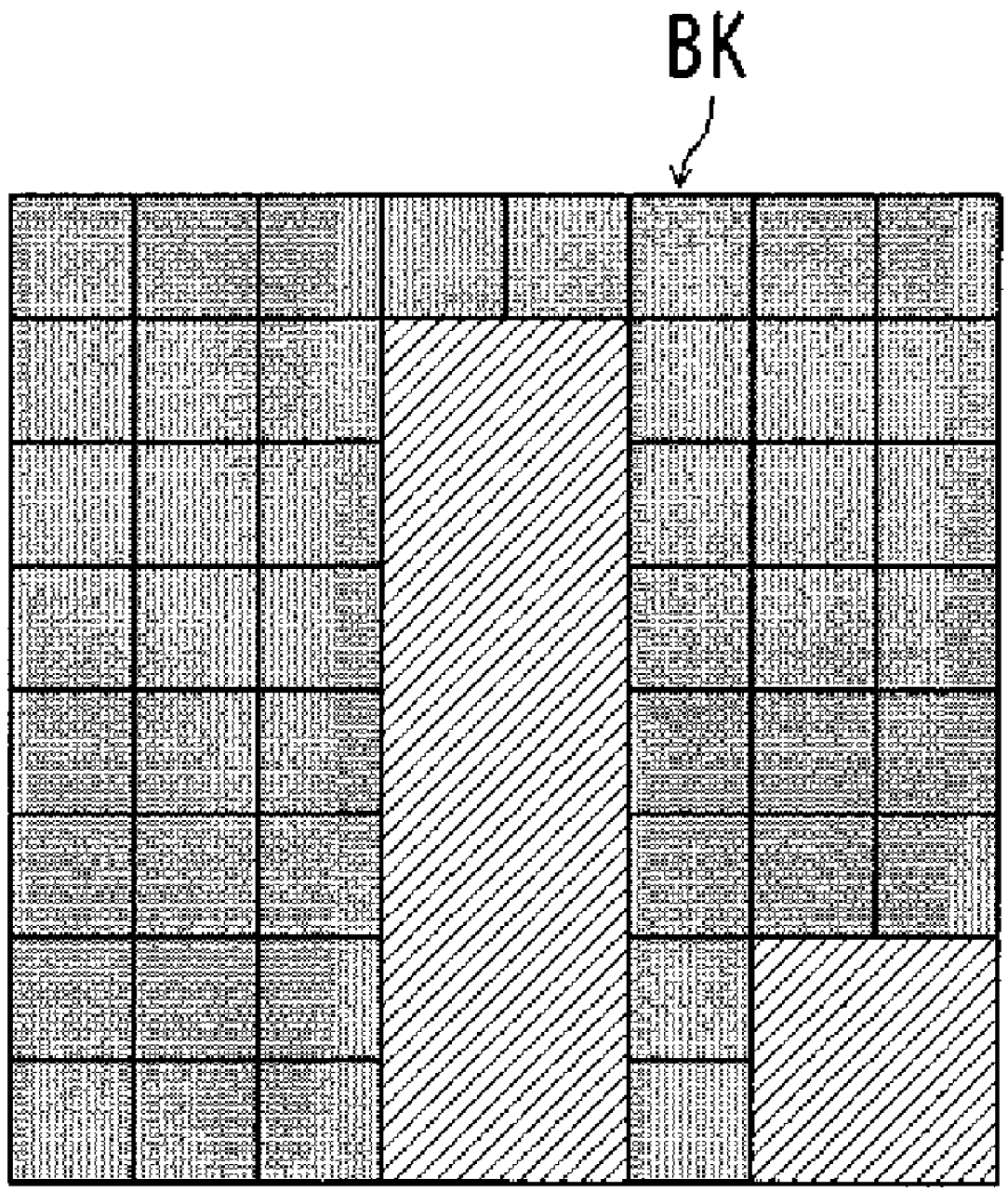
FIG. 18 shows an image after conventional BTC processing has been performed on the block shown in FIG. 16.

When the block BK1 is a block BK like that shown in FIG. 16A, for example, a histogram like that in FIG. 6 is obtained. Note that the block BK shown in FIG. 16A includes an image in which the line drawing portion JS and the background portion that is a background of the line drawing portion JS are expressed.

In this histogram, the group of sectors on the left side are sectors with respect to pixels of the line drawing portion JS. The group of sectors on the right side are sectors with respect to pixels of the background portion. Note that in this histogram, sectors appear brighter (thinner) as the values of color variables grow larger.

In the histogram in FIG. 6, a sector whose number is "0", i.e., a point of discontinuity in the histogram, is searched for in order beginning with sectors near the center. Note that in this case, the sectors at both ends are excluded from being searched. In the example in FIG. 6, when numbers "1" to "16" are allocated in order beginning with a sector on the left, the sixth sector is detected with this search.

Using a value based on the detected sector (for example, the maximum value in that sector) as a threshold value, pixels are divided into a group of pixels for which the value of the target variable is greater than the threshold value, and a group of pixels for which the value of the target variable is smaller than the threshold value. As specific processing when performing grouping, for each pixel, an identification number of the group to which that pixel belongs is allocated, and the coordinates of the pixel and that identification number are saved associated with each other.

Note that when there are no sectors with a number of "0" in the histogram, the value of the midpoint between the maximum and minimum values among the variation values or a value based on the sector nearest to the midpoint serves as a threshold value for grouping.

The group number determination portion 117 determines whether or not the number of groups in the block BK1 has reached a predetermined number of groups (in this embodiment, four groups). Below, this number of groups may also be referred to as a "target number".

When the number of groups has not reached the "target number", grouping processing is performed again by the variation value calculation portion 114, the variation value determination portion 115, the grouping processing portion 116, and the group number determination portion 117. This processing is performed with the following sort of procedure.

First, the variation value calculation portion 114, for each group in the block BK1, obtains variation values for each color variable in that group using the previously described formula (4). When the number of groups is two, in this first example, here six variation values are obtained. The variation value determination portion 115 determines whether or not the largest value among the obtained variation values is less than the predetermined threshold value, i.e., whether or not all of the obtained variation values are less than the predetermined threshold value. If less than the predetermined threshold value, grouping is not performed, and processing moves to the processing of the representative color calculation portion 118. If any of the variation values is equal to or greater than the threshold value, processing moves to the grouping processing.

When the grouping processing is performed, the grouping processing portion 116 selects the color variable with the largest variation value among the six obtained variation values as the target variable, and selects the group of that variation value as the target group. The maximum value and the minimum value of that target variable in that target group are obtained, and a histogram is generated in the same manner as in the case of FIG. 6. Further, that histogram is searched for a point of discontinuity, and based on that search a threshold value for grouping is obtained. Then, based on that threshold value, the pixels belonging to the target group are divided into two groups.

Afterward, in the group number determination portion 117, when it is confirmed that the number of groups has reached the target number, the grouping processing is ended, and processing moves to the processing of the representative color calculation portion 118. When the target number has not been reached, grouping processing is performed again by the variation value calculation portion 114, the variation value determination portion 115, the grouping processing portion 116, and the group number determination portion 117.

The representative color calculation portion 118, for each group in the block BK1, obtains a representative color of that group. Specifically, a representative color is obtained in the following manner.

First, the values of R, G, and B are acquired for each pixel of the group for which a representative color will be obtained. These values of each color variable are indicated in the block data DK acquired by the block data acquisition portion 111. An average value in that group is obtained for each of R, G, and B. The color expressed by the obtained average values of R, G, and B is set as the representative color of that group. In this embodiment, a 24 bit representative color is obtained in which each of R, G, and B are 8 bits. The obtained representative color is saved, associated with the identification number of the group of that representative color, in a predetermined storage region.

The processed block data generation portion 119 generates the processed block data DS, which is data for expressing the image in the block BK1 with the obtained representative color. Indicated by the processed block data DS are a representative color of each group, group identification numbers, the corresponding relationship of groups and representative colors, and the corresponding relationship of pixels and the identification number of the groups to which those pixels belong.

Here, grouping of pixels when viewed in a color space of L, R_G, and B will be described with reference to FIG. 7.

FIG. 7 shows a distribution range G1 when each pixel in the block BK is plotted in a color space of L, R_G, and B, based on the value of each color variable L2, R_G, and B. Here, the distribution range G1 may be referred to as "group G1". Note that in FIG. 7, the distribution of pixels is considered in two dimensions, projected in a plane that passes through an L axis and a B axis. That is, the direction of R_G is not considered. Also, the distribution range Cl is longer in the direction of the B axis.

Prior to grouping, a two-bit identification number is allocated to the group G1. Here, that identification number is "00".

In FIG. 7, ranges RL1 and RB1 respectively indicate the length of the distribution range G1 in the L axis direction and the B axis direction. In the description here, the ranges RL1 and RB1 are variation values of the color variables L and B in this block BK.

Figure 7B:
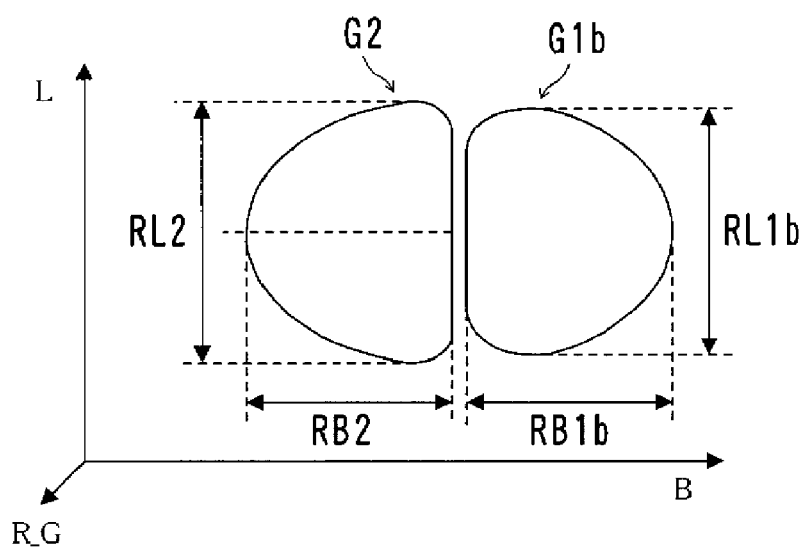

In this example, the range RB1 is longer, so first B is selected as the target variable. When the range RB1, which is the variation value of this target variable, is greater than the predetermined threshold value, the group G1 is divided at the center value of the range RB1, thus creating a new group G2 as shown in FIG. 7B. Here, "01" is allocated as the identification number of the group G2. Below, the remaining portion of the group G1 is referred to as "group G1b".

After division, the length in each direction (ranges RL2, RB2, RL1b, and RB1b) are obtained for each group G1b and G2. Here, the range RL2 is longest.

Figure 7C:
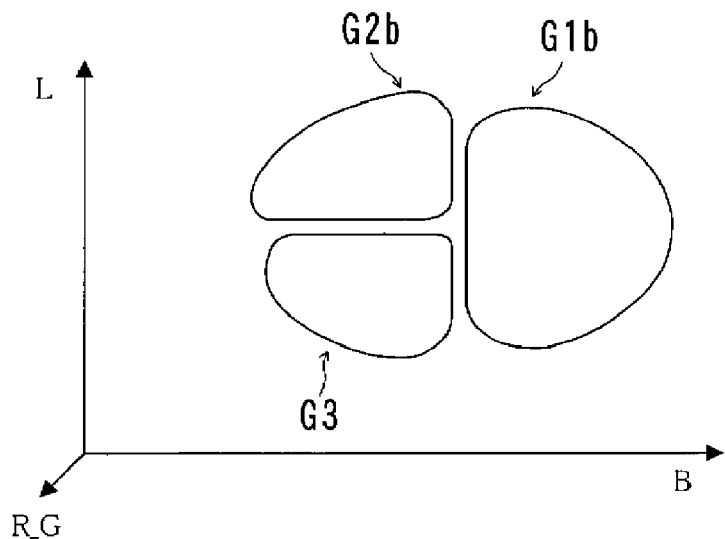

In this case, when the range RL2 is greater than the predetermined threshold value, grouping is further performed. In this case, the group RL2 is divided based on the center value of the range RL2, thus creating a new group G3 as shown in FIG. 7C. Here, "10" is allocated as the identification number of the group G3. Below, the remaining portion of the group G2 is referred to as "group G2b".

In FIG. 7C, likewise, the length in each direction of each group G1b, G2b, and G3 is obtained. When the maximum of those values is equal to or more than the predetermined threshold value, grouping is performed. This sort of processing is repeated until the number of groups is four.

Figure 8:
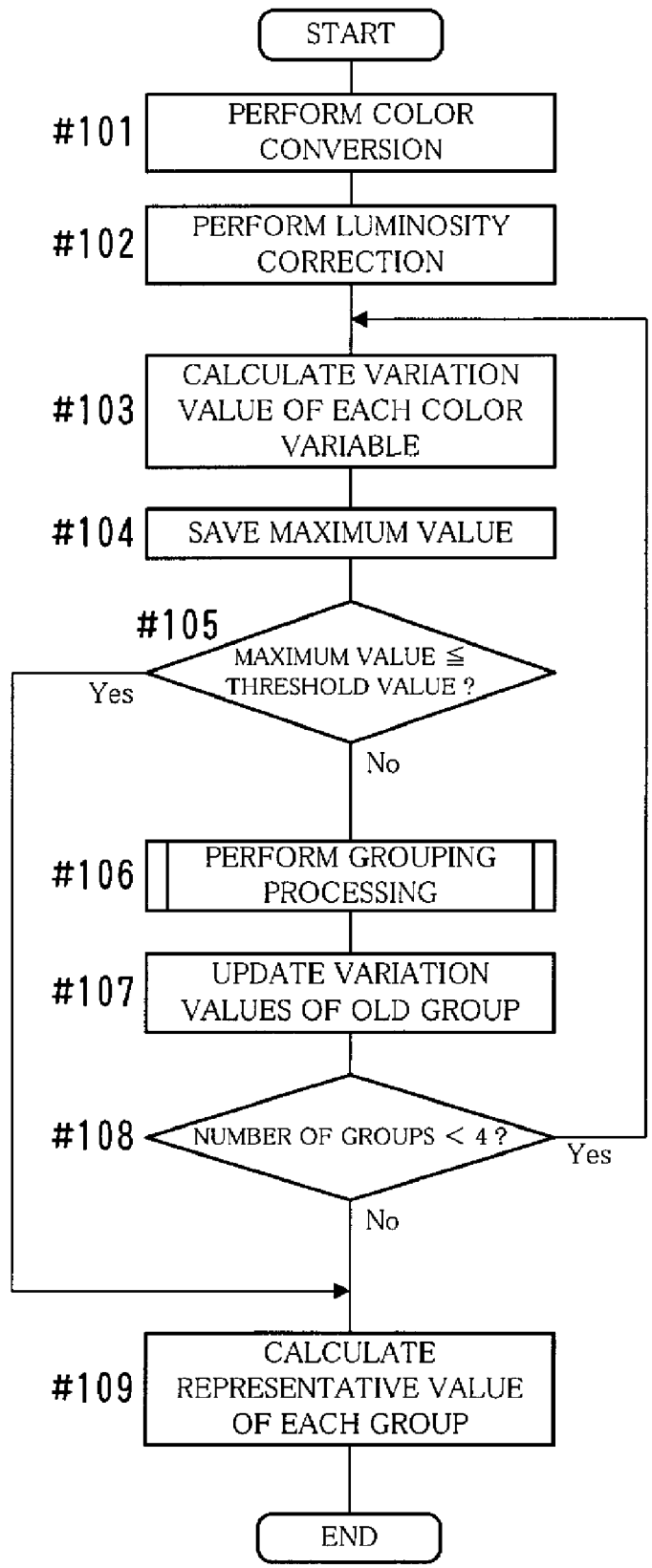
FIG. 8 is a flowchart for illustrating an example flow of processing of each portion in a block processing portion.
Figure 9:
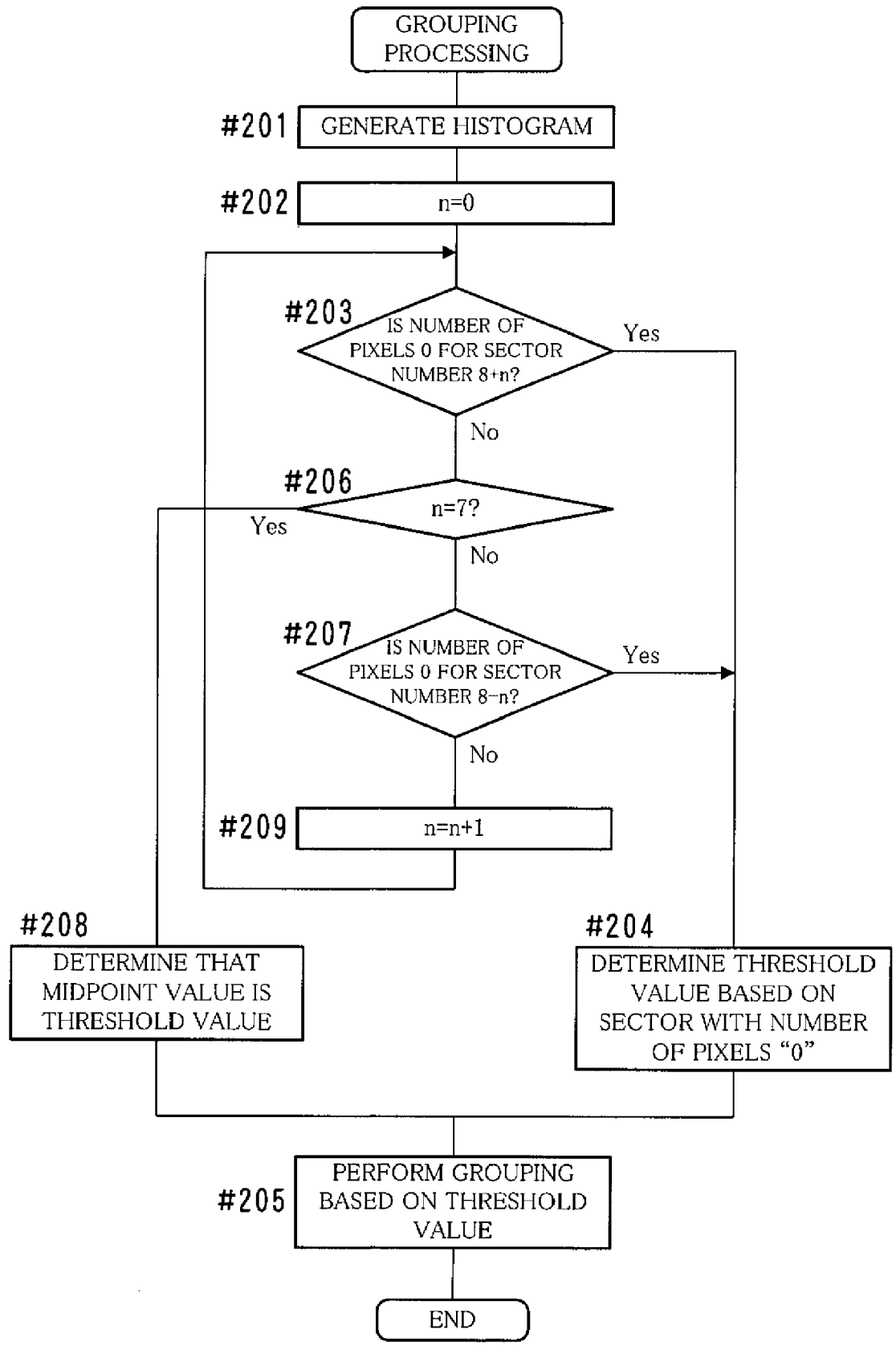
FIG. 9 is a flowchart for illustrating the flow of grouping processing.

FIG. 8 is a flowchart for illustrating an example flow of processing of each portion in the block processing portion 104, and FIG. 9 is a flowchart for illustrating the flow of grouping processing.

In FIG. 8, first, the block data DK is acquired from the image partition processing portion 103. With respect to each pixel in the block BK indicated in that block data DK, the values in the RGB color space are converted to values in the color space (the color space of L, R_G, and B) in which values change proportional to the change in the apparent color (#101). Further, the value of the color variable (L) related to luminosity is corrected so as to be ever greater as that value increases (#102).

With respect to each color variable after Steps #101 and #102, a variation value is obtained, that variation value being the width (range) of change in the block BK (#103). The largest of the variation values obtained is saved, and the color variable whose variation value was the largest is set as the target variable (#104).

When the largest value is equal to or less than the predetermined threshold value (Yes in #105), a representative value is obtained for the block BK (#109). When the largest value is greater than the predetermined threshold value (No in #105), the entire block BK is set as a target group, and grouping processing is performed that groups the pixels belonging to the target group (#106).

In the grouping processing in FIG. 9, first, a histogram is generated that indicates the relationship between the value of that target variable and the number of pixels in the target group (#201). In the description here, the histogram in FIG. 6 is generated.

First, the number of a counter "n" for counting the number of sectors in the histogram is initialized to "0" (#202). The number of pixels in the eighth sector, which is the sector with number "8+n", is checked. If that number is "0" (Yes in #203), the maximum value of that sector is determined to be the threshold value for grouping (#204). Note that in this case, another value in that sector may also be used as the threshold value, such as the minimum value or the center value in that sector. Then, based on the obtained threshold value, the pixels in the target group are divided into two groups (#205).

In Step #203, the number of pixels in the eighth sector in the example in FIG. 6 is not "0", so processing proceeds to Step #206. In Step #206, the value of n is checked. When that value is "7", the value of the midpoint between the maximum and minimum values among the variation values in the target group for the target variable is determined to be the threshold value for grouping (#208). Then, based on the obtained threshold value, grouping is performed (#205). Here, the value of n is "0", so processing proceeds to Step #207 (No in #206).

In Step #207, the number of pixels in the sector with number "8−n" is checked. If that number is "0" (Yes in #207), processing proceeds to Step #204. Here, that number is not "0", so the value of n is incremented by one (#209). Then, processing returns to Step #203, and similar processing from Step #203 onward is repeated. Due to this repetition, a search is performed for a sector for which the number of pixels is "0", in order from the center sector toward both ends.

While the processing is being repeated, at some timing the value of n is incremented to "2". Thereafter, the processing proceeds from Step #207 to Step #204. Then, because the number of pixels is "0" in the sixth sector, which is the sector with number "8−n", the threshold value is determined based on the value of that sector (#204), and grouping is performed (#205).

If there is no sector for which the number of pixels is "0", the processing from Step #203 onward is repeated, and when the value of n becomes "7", processing proceeds from Step #206 to Step #208 (Yes in #206). That is, when the search up to the fifteenth sector ends, search processing ends, and the midpoint value of the maximum and minimum values of the target variable in that group is determined to be the threshold value (#208).

With the above processing, a search of all of the sectors except for the first sector and the sixteenth sector at both ends is performed, beginning with the eighth sector near the middle and proceeding toward the end sectors in order in the manner of the ninth sector, the seventh sector, the tenth sector, etc. Thus, the sector nearest to the midpoint value among discontinuity points where the number of pixels is "0" is detected.

Note that here, any one group created by this grouping is referred to as a new group, and the group of remaining pixels is referred to as an old group.

Returning to FIG. 8, first, a variation value is obtained for each color variable in the old group (#107). At this time, weighting is performed such that the variation values increase as the number of pixels in the group increases. Also, weighting is performed such that the more greatly apparent luminosity increases with a change of a value of the color variable the more the variation value is. When the number of groups has reached four (No in #108), a representative value of each group is calculated (#109).

When the number of groups is less than four (Yes in #108), the processing from Step #103 onward is repeated. In that case, in Step #103, a variation value is obtained for each color variable of the new group. At this time, weighting is performed such that the variation values increase as the number of pixels in the group increases. Also, weighting is performed such that the more greatly apparent luminosity increases with a change of a value of the color variable the more the variation value is.

The maximum value among the obtained variation values is saved (#104). Then, using the color variable and the group for that maximum value as the target variable and the target group respectively, and grouping processing is performed (#106). Then, in the same manner, the processing from Step #103 onward is repeated, so that grouping is repeated until the number of groups reaches four or until the maximum value among the obtained variation values is equal to or less than the predetermined threshold value. Then, a representative value is calculated for each group defined in the block BK (#109), processed block data DS is generated based thereon, and saved.

The above processing is performed for all of the partitioned blocks BK, and compressed data DA for the image data DG is generated.

FIG. 10 shows an image of a block BK after application of BTC processing of this embodiment.

Incidentally, in the conventional method disclosed in U.S. Pat. No. 6,917,704, grouping is performed using the average value of the target variable in the block BK as the threshold value. Accordingly, when the image in the block BK is an image like that shown in FIG. 16A, the threshold value for grouping becomes a value nearer to the darkness value of pixels of the background portion, where there are more pixels, than the darkness value of pixels of the line drawing portion JS, where there are fewer pixels. Thus, for example, in some instances that threshold value may become a value that divides the pixels of the background portion in two, like the value SK shown in FIG. 6. In such a case, part of the background portion becomes classified in the same group as pixels of the line drawing portion, and thus is converted to the same approximate color as the line drawing portion, so image quality is greatly reduced.

However, according to this first example, the threshold value is determined based on a sector where the number of pixels in the histogram is 0, so it is possible to appropriately group into a group of pixels of the line drawing portion and a group of pixels of the background portion, and therefore it is possible to prevent such a reduction in image quality.

Figure 10A:
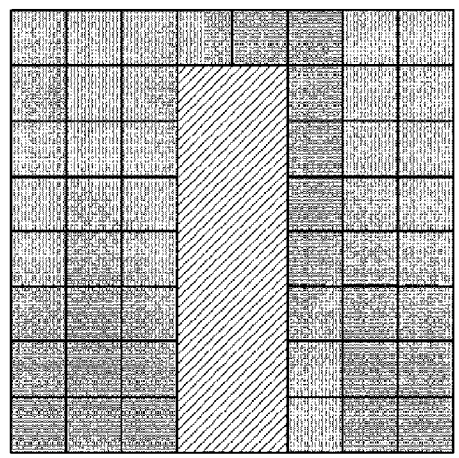
FIG. 10A and FIG. 10B show an image of a block after application of BTC processing of this embodiment.
Figure 10B:
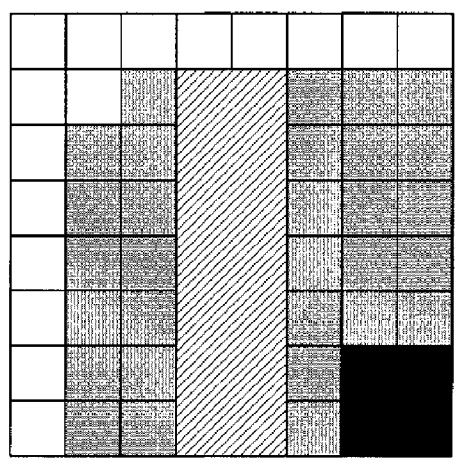

For example, FIG. 10A shows a case in which the content of the block BK is expressed with two representative colors by applying the method of this first example to the block BK in FIG. 16A, i.e. a case of dividing into two groups. FIG. 10B shows a case in which the content of the block BK is expressed with four representative colors.

In a case where the content of the block BK is expressed with two representative colors, the amount of data of the image (a 24-bit full color image) in the original block BK is 1536 bits (24 bits×64 pixels), and the amount of data after compression is 112 bits (1 bit×64 pixels+24 bits×two colors), so the amount of data is compressed to about 7%. In the case where the content of the block BK is expressed with four representative colors, the amount of data after compression is 224 bits (2 bits×64 pixels+24 bits×four colors), so the amount of data is compressed to about 15%.

Also, according to this first example, when four or fewer colors are used in the block BK, grouping is correctly performed for each color, so there is no reduction in image quality due to color change. When more than four colors are used, pixels of nearly the same color are classified in the same group, so the color of pixels can be converted to an appropriate color with little color change.

Moreover, even if the number of groups has not reached the predetermined number, in a case where each variation value obtained for each group in the block BK is equal to or less than the predetermined threshold value, further grouping is not performed. Thus, it is possible to reduce the number of times that grouping processing is performed without greatly reducing image quality, and thus it is possible to raise the efficiency of processing.

Second Example

Figure 11:
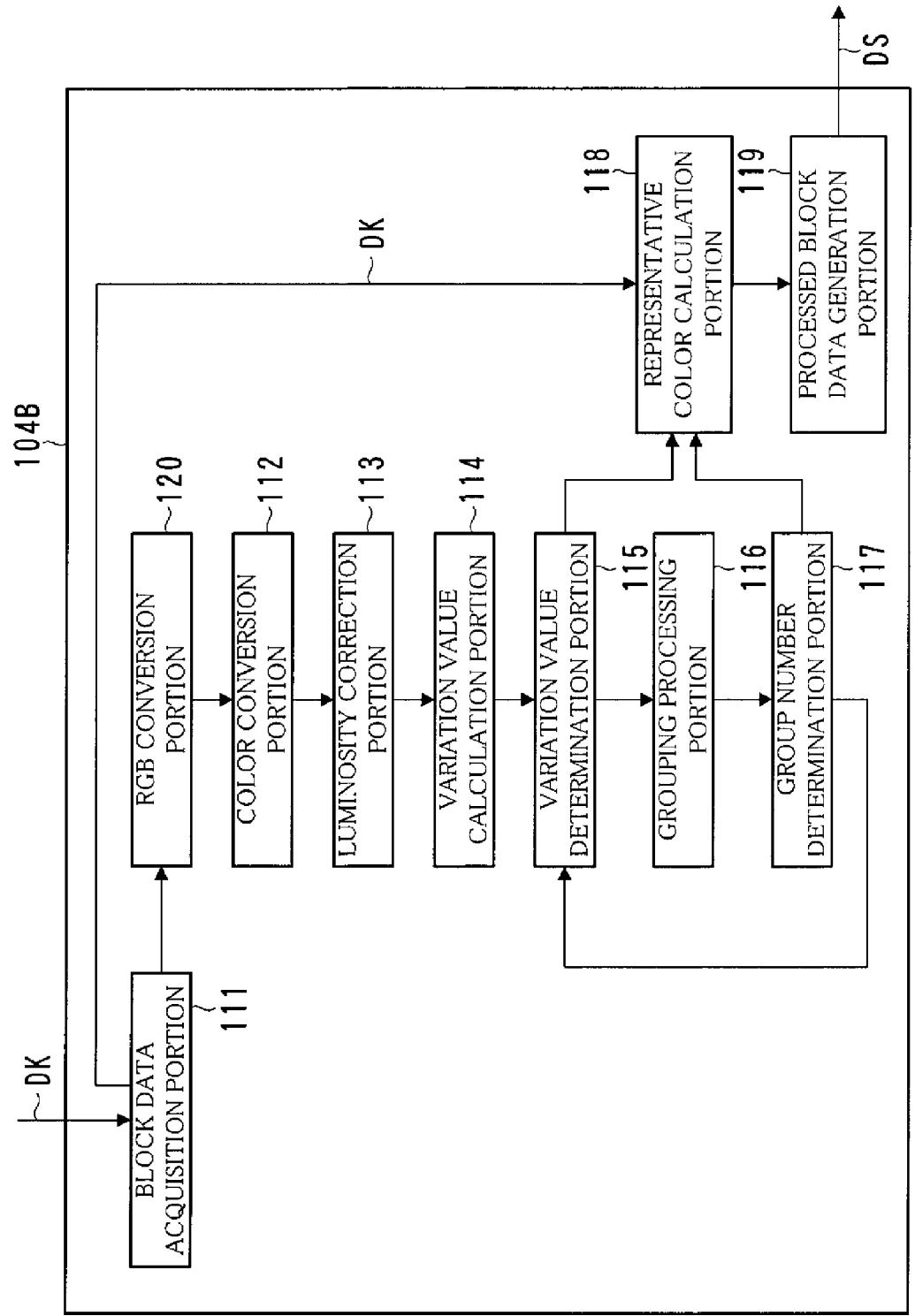
FIG. 11 shows an example configuration of a block processing portion according to a second example.

FIG. 11 shows an example configuration of a block processing portion 104B according to the second example. In this second example, processing of the block processing portion 104 (below, in the second example, referred to as the "block processing portion 104B) is described for a case in which the print target data DP is converted to CMYK image data DG in the image conversion portion 102.

The block processing portion 104B according to the second example is configured as shown in FIG. 11, in which the block processing portion 104 in FIG. 5 is further provided with an "RGB conversion portion".

In FIG. 11, the block data acquisition portion 111 acquires block data DK that includes the value (darkness value) of each color variable (color component) C, M, Y, and K for each pixel in the block BK1.

An RGB color conversion portion 120 obtains a value of each color variable R, G, and B from the value of each color variable for each pixel in that block BK1. Here, formula (6) below is used in consideration of properties of ink and toner. Specifically, the values of R, G, and B are obtained by substituting the value of C, M, Y, and K into the right side of formula (6). This corresponds to reverse UCR conversion.

$$R=(255-C)\times(255+20-K)\div256$$

$$G=(255-M)\times(255+20-K)\div256$$

$$B=(255-Y)\times(255+20-K)\div256 \quad (6)$$

The constant "20" in above formula (6) is a coefficient in consideration of the fact that color tone changes if C, M, and Y change, even when the value of K is 100% ("256" in the case of 256 tones). With this formula, a conversion is performed in which the larger the value of K, the smaller the amount of change in the values of R, C, and B in the block BK1.

The color conversion portion 112 obtains the value of each color variable L, R_G, and B from the value of each color variable R, G, and B that has been obtained. Here, below formula (7) is used instead of above formula (1). However, formula (1) may also be used as-is.

$$L=(R+G)\div2$$

$$R\_G=(R+255+30-G)\div2$$

$$B=B \quad (7)$$

The luminosity correction portion 113 performs correction in order to emphasize the luminosity using above formula (2). However, in this second example, in which a CMYK image is used as a target, computation is performed using "285 (255+30)" as the value "Lmax" in formula (2).

In the case of a CMYK image, due to the difference between the actual color tone and the definition used here, there may be cases when although the color tone has actually changed, the three-dimensional quantity of L, R_G, and B does not change. In such a case as well, in order to allow grouping to be performed appropriately, grouping is performed in a four-dimensional color space that includes K. Because the K element is already included in R, G, and B, correction of the value of K is performed that decreases weighting in the manner of below formula (8). That is, K2 is obtained by substituting the value of K into the right side of below formula (8).

$$K2=K\div4 \quad (8)$$

The variation value calculation portion 114 obtains variation values that indicate the variation state of each color variable in the block BK1. In this second example, below formula (9) is used instead of formula (4). In this case, greater weighting is used for R_G than for B, and greater weighting is used for L than for R_G.

$$R1=(R G\max-R G\min)\times(N+3)\times3$$

$$R2=(L\max-L\min)\times(N+3)\times4$$

$$R3=(B\max-B\min)\times(N+3)\times2$$

$$R4=(K\max-K\min)\times(N+3)\times2 \quad (9)$$

Here,
R1: variation value of R_G
R2: variation value of L2
R3: variation value of B
R4: variation value of K2
RGmax: maximum value of corrected value of R_G in block BK
Rmin: minimum value of corrected value of R_G in block BK
Lmax: maximum value of corrected value of L2 in block BK
Lmin: minimum value of corrected value of L2 in block BK
Bmax: maximum value of corrected value of B in block BK
Bmin: minimum value of corrected value of B in block BK
Kmax: maximum value of corrected value of K2 in block BK
Kmin: minimum value of corrected value of K2 in block BK
N: number of pixels in block BK.

The variation value determination portion 115 determines whether or not the obtained variation value of each color variable is equal to or less than the threshold value. The grouping processing portion 116 performs processing in order to divide the pixels in the block BK1 into two groups when the variation value is greater than the predetermined threshold value.

The group number determination portion 117 determines whether or not the number of groups in the block BK1 has reached the target number. The details of processing of the variation value determination portion 115, the grouping processing portion 116, and the group number determination portion 117 are the same as already described in the first example.

Figure 12:
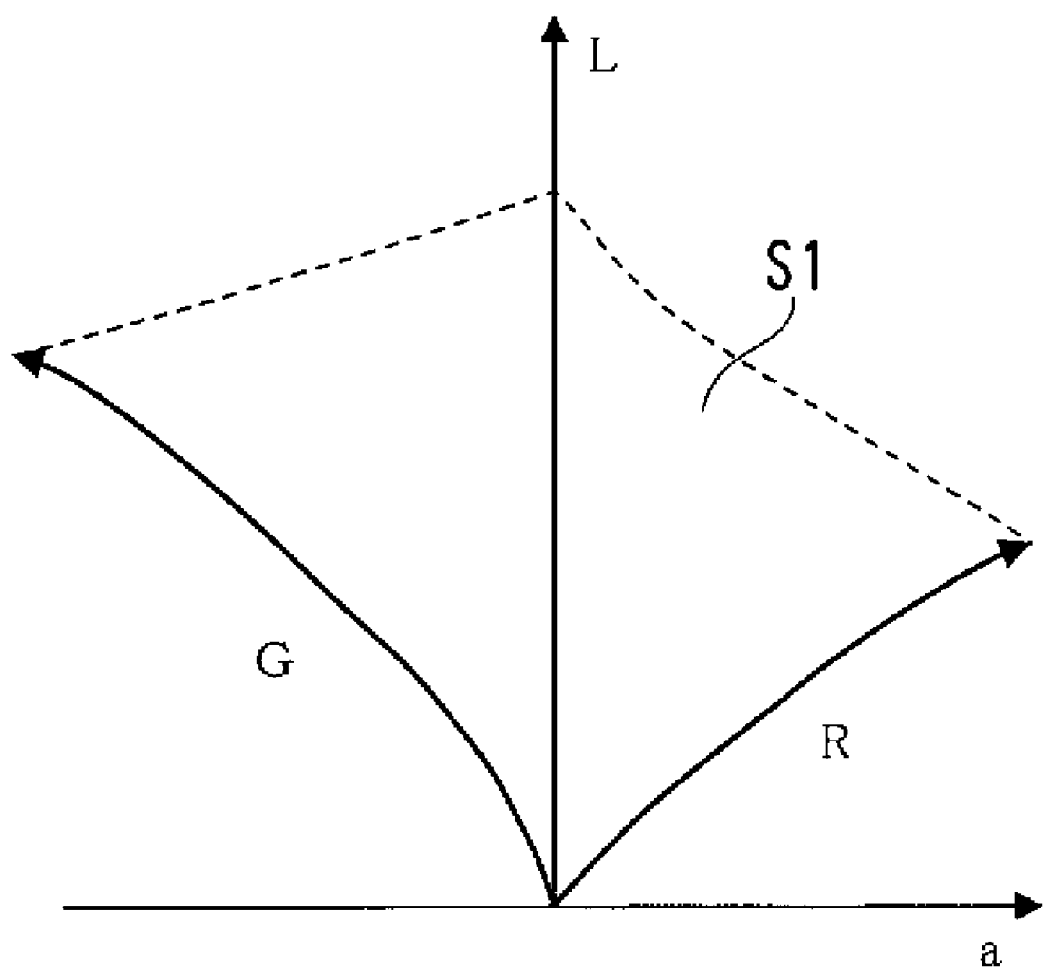
FIG. 12 shows the relationship between the change in the values of R and G in an RGB color space, and the change in the values of L and a in a Lab color space.

FIG. 12 shows the relationship between the change in the values of R and G in the RGB color spacer and the change in the values of L and a in the Lab color space. FIG. 13 shows the relationship between the change in the values of C and M in the CMYK color space, and the change in the values of L and a in the Lab color space. FIG. 14 shows an example block B2, and FIG. 15 shows the values of each color variable for the block B2.

In the RGB color space, when plotting changes in values in the Lab (L*a*b*) color space when the values of R and G have changed in a plane (La plane) passing through the L axis and the a axis, those values are distributed in the range of region S1 shown in FIG. 12.

On the other hand, in the case of the CMYK color space, values are distributed on the La plane as shown in FIG. 13 for changes in the values of C and M. From FIG. 13, it is understood that in the case of CMYK, as the value of K increases, the distribution range of values in the La plane changes in the manner of T1, T2, etc., so that the rate of change in values gradually decreases.

In the Lab color space, it is known that the change in the value of each color variable L, a, and b is generally proportional to the actually appearing color hue. Thus, the fact that the rate of change in the value on the La plane decreases with an increasing value of K as in FIG. 13 indicates that as the value of K increases, there is substantially no change in the appearance for changes in the value of C and M. This means that the change in the value of each CMYK color variable and the change in appearance are not at all proportional.

In order to suppress a reduction in image quality in image conversion using BTC processing, it is necessary to perform grouping such that pixels with a nearby color hue in actual appearance are in the same group, and replace the color of each group with an approximate color, and in the case of a CMYK image, to do so it is necessary to consider the value of K. Consequently, in this second example, conversion is performed with above formula (6) such that the value of each color variable R, G, and B changes according to the value of K.

Figure 14A:
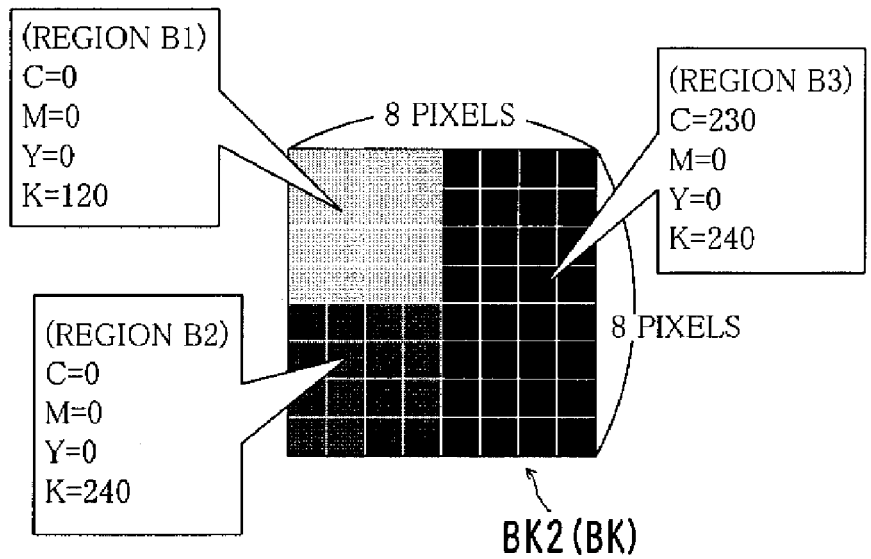
FIG. 14A, FIG. 14B, and FIG. 14C show an example block.

Here, a case is considered in which processing of this second example is applied to the block BK2 shown in FIG. 14A.

As shown in FIG. 14A, the block BK2 is a block with a size of 8 pixels in the vertical direction and 8 pixels in the horizontal direction, and includes three regions B1, B2, and B3. Each region is constituted of pixels of the same color. The value of each color variable C, M, Y, and K in each region is as shown in FIG. 14A.

Here, first, the values in the CMYK color space are converted to values in the RGB color space. When values of R, G, and B are obtained based on formula (6), the respective values shown in FIG. 15A are obtained for each region. Here, computation is performed after rounding off from the first decimal place.

When the obtained values of R, G, and B are substituted into formula (7), the respective values of L, R_G, and B shown in FIG. 15B are obtained for each region. The value of L in each region from FIG. 15B does not satisfy the condition of formula (3), so correction of luminosity using formula (2) is not performed.

Next, the values of K in each region B1, B2, and B3 are corrected using formula (8) to "30", "60", and "60", respectively.

Then, using the obtained values of L, R_G, B, and K, variation values are obtained based on formula (9).

From formula (9), the variation values of R_G, L, B, and K are respectively "3115", "36448", "16080", and "4020". Here, L, which has the maximum variation value, is selected as the target variable.

From FIG. 15B, the maximum and minimum values of L in the block BK2 are respectively "154" and "19", so the threshold value for grouping becomes the midpoint value between those maximum and minimum values, "87".

Figure 14B:
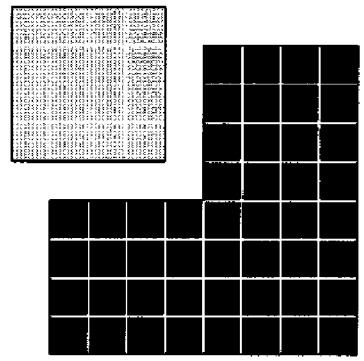

When the pixels in the block BK2 are divided into a group in which the value of L is equal to or grater than this threshold value, and a group in which the value of L is less than this threshold value, as shown in FIG. 14B, it is possible to divide into a group of pixels included in the region B1 and a group of pixels included in the regions B2 and B3.

Figure 14C:
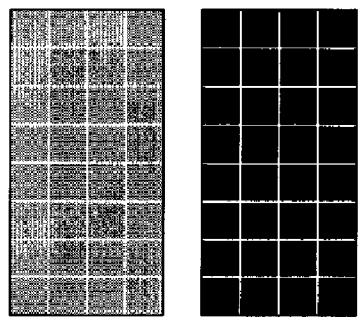

In the case of a CMYK image, for an image with a high K value, the change in the apparent color is small even if the change in the values of C, M, and Y is large. However, conventionally, when the change in the values of C, M, and Y is large, grouping as shown in FIG. 14C occurs regardless of the change in apparent color.

However, when applying the method of this second example, the value of K is considered, so appropriate grouping according to the apparent color hue is possible, and thus it is possible to suppress a reduction in image quality due to BTC relative to the reduction in the conventional technology.

In this embodiment, in order to perform grouping, variation values are obtained for values in a color space of L, R_G, and B, but variation values may also be obtained for values in an RGB color space.

Note that the BTC processing according to this embodiment can also be executed in an apparatus other than the printer 13, such as the computer body 11.

Furthermore, the configuration of all or any portion of the printing system 1 and the printer 13, functions, target numbers, each threshold value, content indicated by each piece of data, content or order of processing, or the like can be appropriately modified according to the gist of the invention.

The invention may be embodied in other forms without departing from the spirit or essential characteristics thereof. The embodiments disclosed in this application are to be considered in all respects as illustrative and not limiting.

The scope of the invention is indicated by the appended claims rather than by the foregoing description, and all changes which come within the meaning and range of equivalency of the claims are intended to be embraced therein.

What is claimed is:

1. An image processing method for expressing small regions in an image with not more than a predetermined number of representative colors, in which an image processing is carried out for each of the small regions, the method comprising:
   a first selection step of, with respect to a plurality of pixels in the small region, based on variation values that indicate the extent of variation, in the small region, of values of a plurality of color variables that express a color of each of the pixels, selecting one of the color variables as a target color variable;
   a first reference value calculation step of, from among values from a maximum value to a minimum value of the target color variable in the small region, when there is a value of the target color variable for which the number of pixels is "0", obtaining the value of the target color variable as a first reference value for grouping the pixels;
   a first grouping step of grouping the pixels in the small region based on the first reference value obtained in the first reference value calculation step; and
   a first representative color calculation step of, for each of groups in the first-grouped small region, obtaining a representative color based on a value of each of the color variables of pixels that belong to the group,
   wherein said plurality of color variables includes a luminosity that has been corrected to increase the respective value of the luminosity when the originally obtained value for a specific pixel exceeds a set threshold.

2. An image processing method for expressing small regions in an image with not more than a predetermined number of representative colors, in which an image processing is carried out for each of the small regions, the method comprising:
   a first selection step of, with respect to a plurality of pixels in the small region, based on variation values that indicate the extent of variation, in the small region, of values of a plurality of color variables that express a color of each of the pixels, selecting one of the color variables as a first target color variable;
   a first reference value calculation step of, from among values from a maximum value to a minimum value of the first target color variable in the small region, when there is a value of the first target color variable for which the number of pixels is "0", obtaining the value of the first target color variable as a first reference value for grouping the pixels;
   a first grouping step of grouping the pixels in the small region based on the first reference value obtained in the first reference value calculation step;
   a second selection step of determining the variation value for each color variable in each group obtained in the first grouping step, selecting the group with the largest variation value as a target group and selecting the color variable with the largest variation value as a second target color variable, based on the variation values of the color variables in each of the groups obtained in the first grouping step;

a second reference value calculation step of, from among values from a maximum value to a minimum value of the second target color variable in the target group, when there is a value of the second target color variable for which the number of pixels is "0", obtaining the value of the second target color variable in the target group as a second reference value for grouping the pixels;

a second grouping step of grouping the pixels in the target group based on the second reference value obtained in the second reference value calculation step; and a representative color calculation step of, for each of groups obtained in the second grouping step, obtaining a representative color based on a value of each of the color variables of pixels that belong to the group.

3. The image processing method according to claim 2, wherein the first selection step obtains the variation value by performing weighting such that the more greatly color changes with a change of a value of the color variable the more the variation value is.

4. The image processing method according to claim 2, wherein the second selection step obtains the variation value by, for each of the groups in the small region, performing weighting such that the variation value increases as the number of pixels in the group increases.

5. The image processing method according to claim 2, wherein with respect to the small region, the second selection step, the second reference value calculation step, and the second grouping step are repeated until the number of groups in the repeatedly-grouped small region becomes a predetermined number.

6. The image processing method according to claim 2, wherein the first reference value calculation step, when there are a plurality of values of the first target color variable for which the number of pixels is "0",from among the plurality of values, obtains a value nearest to a middle value between a maximum value and a minimum value of the first target color variable in the small region as the first reference value.

7. The image processing method according to claim 2, wherein the first selection step employs a difference between a maximum value and a minimum value of a color variable in the small region as the variation value of the color variable.

8. The image processing method according to claim 2, wherein the first selection step selects a color variable for which the variation value is maximum as the first target color variable.

9. The image processing method according to claim 2, wherein the second selection step obtains the variation value for each of the color variables in each of the groups obtained in the first grouping step, and selects a group and a color variable for which the obtained variation value is maximum as the target group and the second target color variable, respectively.

10. The image processing method according to claim 2, wherein the representative color calculation step employs a color expressed by an average value of values of the color variables of each of the pixels in the group as the representative color of the group.

11. The image processing method according to claim 2, wherein the second selection step obtains the variation value by performing weighting such that the more greatly color changes with a change of a value of the color variable the more the variation is.

12. The image processing method according to claim 2, wherein the second reference value calculation step, when there are a plurality of values of the second target color variable for which the number of pixels is "0", from among the plurality of values, obtains a value nearest to a middle value between a maximum value and a minimum value of the second target color variable in the target group as the second reference value.

13. The image processing method according to claim 2, wherein the second selection step employs a difference between a maximum value and a minimum value of a color variable in the small region as the variation values of the color variable.

14. An image processing method for expressing small regions in an image with not more than a predetermined number of representative colors, in which an image processing is carried out for each of the small regions, the method comprising:

a first selection step of, with respect to a plurality of pixels in the small region, based on variation values that indicate the extent of variation, in the small region, of values of a plurality of color variables that express a color of each of the pixels, selecting one of the color variables as a target color variable;

a first reference value calculation step of, from among values from a maximum value to a minimum value of the target color variable in the small region, when there is a value of the target color variable for which the number of pixels is "0", obtaining the value of the target color variable as a first reference value for grouping the pixels, or in the alternative, when there is no value of the target color variable for which the number of pixels is "0", obtaining a value nearest to a middle value between a maximum value and a minimum value as a first reference value;

a first grouping step of grouping the pixels in the small region based on the first reference value obtained in the first reference value calculation step; and a first representative color calculation step of, for each of groups in the first-grouped small region, obtaining a representative color based on a value of each of the color variables of pixels that belong to the group wherein said plurality of color variables include a luminosity that has been corrected to increase the respective value of the luminosity when the originally obtained value for a specific pixel exceeds a set threshold.

15. An image processing apparatus that performs image processing that expresses small regions in an image with not more than a predetermined number of representative colors, the image processing being carried out for each of the small regions, the apparatus comprising:

a first selection portion that, with respect to a plurality of pixels in the small region, based on variation values that indicate the extent of variation, in the small region, of values of a plurality of color variables that express a color of each of the pixels, selects one of the color variables as a first target color variable;

a first reference value calculation portion that, from among values from a maximum value to a minimum value of the first target color variable in the small region, obtains a value of the first target color variable for which the number of pixels is "0", as a first reference value for grouping the pixels;

a first grouping portion that groups the pixels in the small region based on the first reference value obtained by the first reference value calculation portion;

a second selection portion that, based on the variation values of the color variables in each of the groups obtained by the first grouping portion, determines the variation value for each color variable in each group obtained by the first grouping portion, selects the group with the largest variation value as a target group and selects the color variable with the largest variation value as a second target color variable;

a second reference value calculation portion that, from among values from a maximum value to a minimum value of the second target color variable in the target group, when there is a value of the second target color variable for which the number of pixels is "0", obtains the value of the second target color variable in the target group as a second reference value for grouping the pixels;

a second grouping portion that groups the pixels in the target group based on the second reference value obtained by the second reference value calculation portion; and a representative color calculation portion that, for each of groups obtained by the second grouping portion, obtains a representative color based on a value of each of the color variables of pixels that belong to the group.

16. An image data compression apparatus, comprising:

a partitioning portion that performs partitioning of image data for each of a plurality of small regions including a plurality of pixels;

a first selection portion that, with respect to a plurality of pixels in the small region, based on variation values that indicate the extent of variation, in the small region, of values of a plurality of color variables that express a color of each of the pixels, selects one of the color variables as a first target color variable;

a first reference value calculation portion that, from among values from a maximum value to a minimum value of the first target color variable in the small region, obtains a value of the first target color variable for which the number of pixels is "0" as a first reference value for grouping the pixels;

a first grouping portion that groups the pixels in the small region based on the first reference value obtained by the first reference value calculation portion;

a second selection portion that, based on the variation values of the color variables in each of the groups obtained by the first grouping portion, determines the variation value for each color variable in each group obtained by the first grouping portion, selects the group with the largest variation value as a target group and selects the color variable with the largest variation value as a second target color variable;

a second reference value calculation portion that, from among values from a maximum value to a minimum value of the second target color variable in the target group, when there is a value of the second target color variable for which the number of pixels is "0", obtains the value of the second target color variable in the target group as a second reference value for grouping the pixels;

a second grouping portion that groups the pixels in the target group based on the second reference value obtained by the second reference value calculation portion;

a representative color calculation portion that, for each of groups obtained by the second grouping, obtains a representative color based on a value of each of the color variables of pixels that belong to the group; and a compressed data generation portion that, with respect to each of the small regions of the image data, generates compressed data using the representative color obtained by the representative color calculation portion.

17. A non-transitory computer readable storage medium having stored thereon a computer program that causes image processing to be performed that expresses small regions in an image with not more than a predetermined number of representative colors, the image processing being carried out for each of the small regions, by causing a computer to execute:

a first selection step of, with respect to a plurality of pixels in the small region, based on variation values that indicate the extent of variation, in the small region, of values of a plurality of color variables that express a color of each of the pixels, selecting one of the color variables as a first target color variable;

a first reference value calculation step of, from among values from a maximum value to a minimum value of the first target color variable in the small region, obtaining a value of the first target color variable for which the number of pixels is "0" as a first reference value for grouping the pixels;

a first grouping step of grouping the pixels in the small region based on first the reference value obtained in the reference value calculation step;

a second selection step of determining the variation value for each color variable in each group obtained in the first grouping step, selecting the group with the largest variation value as a target group and selecting the color variable with the largest variation value as a second target color variable, based on the variation values of the color variables in each of the groups obtained by the first grouping portion;

a second reference value calculation step of, from among values from a maximum value of the second target color variable in the target group, when there is a value of the second target color variable for which the number of pixels is "0", obtaining the value of the second target color variable in the target group as a second reference value for grouping the pixels;

a second grouping step of grouping the pixels in the target group based on the second reference value obtained by the second reference value calculation portion; and a representative color calculation step of, for each of groups obtained in the second grouping step, obtaining a representative color based on a value of each of the color variables of pixels that belong to the group.

* * * * *